United States Patent

Jahn

[11] 3,889,383
[45] June 17, 1975

[54] METHOD OF MACHINING PRINTED-CIRCUIT BOARDS AND/OR WORKING PATTERNS FOR SUCH PRINTED-CIRCUIT BOARDS

[75] Inventor: Alfred Jahn, Munich, Germany

[73] Assignee: Siemens Aktiengesellschaft, Germany

[22] Filed: Sept. 25, 1973

[21] Appl. No.: 400,530

[30] Foreign Application Priority Data
Sept. 28, 1972 Germany............................ 2247831

[52] U.S. Cl............................................... 33/180 R
[51] Int. Cl. .............................................. G01b 5/24
[58] Field of Search ........... 33/180 R, 181 R, 184.5, 33/174 G, 1 C

[56] References Cited
UNITED STATES PATENTS
3,686,764  8/1972  Oesterritter........................... 33/1 C Primary Examiner—Richard E. Aegerter
Assistant Examiner—Willis Little
Attorney, Agent, or Firm—Schuyler, Birch, Swindler, McKie & Beckett

[57] ABSTRACT

A method of minimizing errors in the machining of printed-circuit boards, machining patterns, printing tools or the like is disclosed. First, the variations of the actual or basic grid of the existing printed-circuit board or the like from a given theoretical reference grid are determined; thereafter, the reference point of the machining operations is selected on the basis of said variations such that the actual variation between actual and theoretical reference grid is minimal.

3 Claims, 1 Drawing Figure

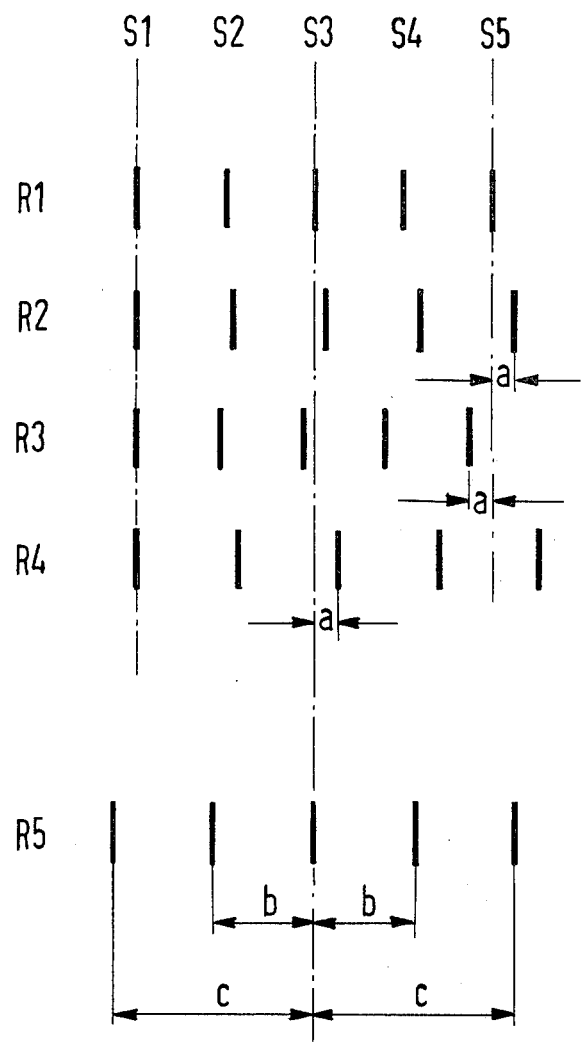

METHOD OF MACHINING PRINTED-CIRCUIT BOARDS AND/OR WORKING PATTERNS FOR SUCH PRINTED-CIRCUIT BOARDS

BACKGROUND OF THE INVENTION

The invention relates to a method of machining printed-circuit boards and/or forms, for example printing tools for making such printed-circuit boards, wherein the site of the machining operations is located on a crossing point of an actual grid system on the board varying with a specified maximum tolerance from a prearranged theoretical reference grid system.

In printed-circuit board techniques, machining patterns, forms, printing tools and the like are employed which exhibit the image of the elements of a circuit configuration (soldering terminals, etched areas or the like) in accordance with the printed-circuit boards to be provided. For example, bonding, hand-drawn or machine-drawn forms are employed wherein all elements of the image are placed in a predetermined grid field. In order to obtain a high degree of accuracy when positioning the picture elements on the form, it is preferable that numerically controlled highly accurate light signal devices be employed. With respect to the provision of printing tools by which the photographic method all the printed elements provided in accordance with a wiring diagram are transferred onto a light-sensitive layer of a board (to become the printed-circuit board) of insulating material, very great demands are made for accurate positioning of the picture elements on the machine-drawn form. Such tolerance limits are necessary, because in the manufacturing process the printed-circuit board printed with the picture elements is drilled on the crossing points of the grid field. Ordinarily, numerically controlled drilling machines, for example, multiple-spindle gang drills, are employed for this purpose. Opposite the drilling spindles of such drilling machines, the conducting plate is machined and drilled around the reference grid points. The bore holes must register almost perfectly in the center of the soldering terminals. Of primary importance for accurate positioning of the holes provided is obtaining substantial correspondence between the position of the zero or reference point of the drilling machine operating in accordance with a predetermined program relative to a coordinate system and, thus, relative to the individual reference grid points of the drilling table, and the position of the reference point in the predetermined theoretical grid field. The relatively small deviation of the actual position of the picture elements in an actual grid field from a predetermined theoretical reference grid is obtained by adding up all the tolerances in the manufacturing process from the time the forms are provided to the drilling of the printed-circuit boards. Each manufacturing step is burdened with tolerances, the worst case being the sum of all these tolerances. Only very small tolerance limits are allowed in multilayer printed-circuit boards, where an accurate alignment of the picture elements in the various positions is a requisite condition for its usefulness. An attempt must therefore be made to minimize the deviations of the actual reference grid on the board from the desired theroetical reference grid, keeping them within the allowable tolerance limits. Heretofore, the common practice was to measure the deviations of the actual positions of the picture elements from the theroetical reference grid. If the allowable tolerance is exceeded, the relevant form, the printing tool, or the printed-circuit board yet to be drilled must be disposed of.

SUMMARY OF THE INVENTION

It is an object of the invention to substantially reduce the reject rate through a suitable method when machining printed-circuit boards, forms, printing tools, and the like, taking into account the deviations of an actual reference grid from a theoretical reference grid which are unavoidable in a manufacturing process.

In accordance with the invention, the foregoing and other objects are achieved in that in an initial process step the algebraic sign and amount of the existing deviations of the actual reference grid relative to the theoretical reference grid are determined; in a subsequent process step the reference point of the machining operations taking place in the theoretical reference grid mass is so selected on the basis of the determined deviations relative to at least one direction of coordinates of the reference grid that the maximum amount of the actual deviations between the crossing points of the actual reference grid and those of the theoretical reference grid within a row of of reference grid measuring points is minimal. In the initial process steps, the positional accuracy of the crossing points of the actual reference grid are determined with respect to the desired or theoretical reference grid for each test point, for example, of each individual position of a mutilayer printed-circuit board. Those errors or variations caused by faults in the material, by influences in the photographic method, or by machine-caused influences, show a certain tendency in most cases. In the final analysis, this may cause the tolerance limits for the actual grid relative to the theoretical reference grid to be exceeded in one direction. This tendency can be determined; for example, all the check points may deviate in a positive or a negative direction. In the case of multilayer circuits, the position of the corresponding test points on the individual positions relative to one another is examined. By suitably selecting the reference point, the predetermined allowable tolerance can be distributed in accordance with the determined tendency. If, for example, the error displacement of the individual test points lies in a positive direction over a whole layer, the entire allowable error tolerance can be utilized in the positive and negative directions by placing the reference point for all the picture points in a middle or balance point, whereby the two external reference grid points of the actual reference grid having greatest deviation have a variation lying within the allowable tolerance limits. In other words, the first process step is a check to determine if there are variations between the actual standard grid (realized by the available picture elements present on the form, on the printing tool or on the printed-circuit boards) and the desired standard grid, and what sign and amount said variations exhibit. Those variations that lie outside the prearranged allowable tolerance limits, for example, through the accumulated error of the individual variations of a row of standard grid points which heretofore would necessarily result in the elimination of the form or the like, can be compensated for by shifting the reference point, i.e., for example, the zero position of a drilling machine or the fitting sleeves of a printing tool relative to its theoretical desired position so that the maximum amount of actual variation of the actual standard grid relative to the desired reference standard grid is minimized and lies within the allowable tolerance limits. The method according to the invention effectively extends the tolerance limits allowable in conventional methods for positional deviations of picture elements by a factor of about two. It is clear that by virtue of the flexible tolerance distribution provided by the invention the reject rate of forms, printing tools or printed-circuit boards can be reduced to a minimum.

According to a further development of the invention, the fixation of the reference point takes place through corresponding fits arranged on the printing tools for the printed-circuit boards. Such fits, which, for example, can be realized by means of fitting sleeves molded or impressed in insulating material, are especially required in the manufacture of multilayer printed-circuit boards. They determine the positions of the individual layers of the printed-circuit board relative to one another. As mentioned at the beginning of this application, in the case of such multilayer construction, a very narrow tolerance range must be precisely adhered to. According to the method of the invention, the deviations in the individual patterns of picture elements on the individual layers can be compensated for by determining the reference point with the aid of the actual reference grid ratios deviating from the desired theoretical reference standard grid.

In an especially advantageous embodiment of the inventive method, the optimum reference point of the maachining operation is determined separately for each row of reference grid points of a group of rows of standard grid points for a first direction of coordinates; upon the shifting of the machining device in the second coordinate direction a corresponding positional correction of the machining device takes place corresponding to the varying positions of the reference points in the individual rows of standard grid points or groups in the first coordinate direction. The machining process can particularly be usefully employed when drilling the through passages provided for printed-circuit boards, for example, in the entire standard grid. The corrections of the reference point determined by measuring the tendency and the actual variation as a function of the respective positions of the reference and standard picture elements yields a curve according to which, for example, the zero point of the drilling machines can be corrected.

BRIEF DESCRIPTION OF THE DRAWING

The principles of the invention will be more readily understood by reference to the description of a preferred embodiment given hereinbelow in conjunction with the drawing which is a schematic diagram of a reference grid constructed according to the invention.

DESCRIPTION OF PREFERRED EMBODIMENTS

The schematic diagram of the reference grid shows individual rows of reference grid points R1 to R5 in one coordinate direction (e.g., x coordinates) of a two-dimensional reference grid field. Each row R1 to R5 contains five reference grid points S1 to S5. The reference grid row R1 represents a given theoretical reference grid whose individual crossing points R1 S1, R1 S2 – R1 S5 lie at equal distances from one another.

It is assumed that the rows of reference grid points R2, R3 and R4 form an actual grid system comprising the crossing points R2 S1 . . . to R4 S5. For example, on each crossing point, the various printed elements of a printed circuit, such as soldering terminals, clean-etched areas, printed lines, etc., appear, it being assumed that the picture elements are applied to a board of insulating material by a printing mode and that through passages shall be drilled on some or all crossing points. The schematic diagram of the reference grid shows that each of the actual reference grid rows of reference grid points R2 to R4 differs in varying degrees from the theoretical reference grid R1. In the case of reference grid row R2, a linearly increasing time lag of the individual crossing points is present in a positive direction; while in the case of R3 a linearly increasing time lag in a negative direction can be seen. In the case of the rows of reference grid points R2 and R3, the total variations $a$ obtained through the addition of the individual variations still lie within an allowable tolerance range identical to or greater than $a + a$. By contrast, in the case of the row of reference grid points R4, a variation having the value $a$ and positive sign can be found on the crossing point R4 S3; this variation lies on the border of the allowable tolerance range. Using as a reference point the crossing point R4 S1 the crossing points R4 S4 and R4 S5 lie outside the allowable tolerance range. Assuming that soldering terminals of a printed circuit are located on the crossing points R4 S4 and R4 S5, then during the drilling by means of, say, a numerically controlled drilling machine whose drilling spindles are adjusted to a micrometer setting relative to a zero point of the machine, and which executes step-by-step feed movements in accordance with the spacing of theoretical reference grid row R1, the bore holes at points R4 S4 and R4 S5 are placed at points outside the contours of the soldering terminals. The printed-circuit board is thus unusable.

Absolute deviations with regard to the desired reference grid row R1 can again be determined for the row of actual grid points R5 after adjustment for individual crossing points R5 S1 to R5 S5 which correspond to the deviations of the rows of reference grid points R4. As follows from the method discussed hereinabove, the accuracy of position of each actual reference grid relative to the theoretical reference grid R1 is determined through measuring. It is checked to determine whether the test points of a printed-circuit board or of the individual layers of a multilayer circuit deviate in greater part in a positive or a negative direction. In multilayer circuits the position of corresponding test points on separate layers are examined relative to one another. Then, in accordance with the determined trend of the deviations, the allowable tolerance can be distributed by suitably selecting the reference point. If, for example, the linear time lag (deviation) over the entire row of actual reference grid points or over the entire grid field has a positive tendency, then the whole allowable tolerance range in the positive and negative directions can be utilized by centering the reference point R5 S3, as explained hereinabove with the aid of the row of reference grid points R5 for all the picture element (crossing points) of said row of reference grid points or of the grid field. After adjustment of the reference point R5 S3 the two outermost crossing points deviate in substantially the same manner in positive and negative directions namely, by the distribution multiple $c$, and the intermediate points also lie within the allowable tolerance range as indicated by the simple division $b$.

When machining printed-circuit boards printed or etched with printed elements of different sorts by means of a drilling machine, the reference points generated in the course of the measurement procedure lie, depending on the determined deviations in the individual rows of reference grid points, for example, on a line R4, R5.

After drilling in a first coordinate direction (e.g., $x$ direction) in accordance with the reference point determined spacially in the case of the row of reference grid points or in accordance with the zero point of the machine fixed according thereto, a positional correction of the zero point of reference grid of the machine and, thereby, a positional correction of the machining device is effected upon the shifting of the drilling spindle in the second coordinate direction ($y$ direction) according to the course of the curve or the position of the reference point of the second row of reference grid points.

The same is true with regard to the use of the printing tools. Such printing tools, also called master plates, consist, for example, of glass plates on which the desired printed-element patterns in an actual grid field are applied, for example, by photographic means ordinarily with some unavoidable deviations from the theoretical reference grid. By another photographic procedure, the printed-element pattern of the relevant printing tool is transferred to the printed-circuit board coated with a photosensitive layer. Particularly when making multilayer printed-circuit boards, the fitting sleeves in the various printing tools for the individual layers must be so positioned that the deviations of the actual grid systems can be compensated so as to align the picture elements corresponding to one another on the individual combined layers. In so doing, the fitting sleeves form the reference points corresponding to the crossing points R5 S3 as depicted in the schematic diagram of the reference grid.

I have described herein preferred embodiments of this invention; however, modifications may occur to others which do not depart from the spirit and scope of this invention whose limits are intended to be described only by the appended claims.

I claim:

1. A method of machining printed circuit boards wherein each desired site of a machining operation is located on one of a plurality of fixed points in an actual machining pattern, said fixed point being located with respect to a theoretical grid crossing point of a reference grid system established for each said printed circuit board, said board reference grid being initially congruent with the reference placement grid of a machining device on which are to be located the actual sites of the machining operations of said device, comprising determining the deviation in terms of direction and numerical value in one coordinate direction of each desired machining pattern site in a row with respect to a row of said theoretical reference crossing points on said printed circuit board reference grid;

selecting one of said desired points as the basic reference point for locating said machining operation relative to said machining device reference placement grid, shifting said selected basic reference point and the corresponding crossing point of said printed circuit reference grid relative to said machining device tool placement grid to minimize the variation between each of said desired points to be adopted as a machining site and the corresponding grid row crossing point of said machining device reference placement grid.

2. The method as set forth in claim 1, wherein for each shift of the machining site in a second coordinate direction to another of said fixed points located relative to a second row of reference grid crossing points, said steps of determining, selecting and shifting are repeated for said fixed points in said second row relative to said theoretical row of grid crossing points to reduce variation between said fixed points in said second row and said machine device reference placement grid separately for each row of fixed points.

3. The method as set forth in claim 1, characterized by the fact that the selection of said zero reference point takes place through corresponding reference markings located on tools for printing the printed-circuit boards.

* * * * *